US012718968B2

(12) United States Patent
Thorn et al.

(10) Patent No.: US 12,718,968 B2
(45) **Date of Patent: *Aug. 25, 2026**

(54) SEMICONDUCTIVE POLYMER COMPOSITION

(71) Applicant: BOREALIS AG, Vienna (AT)

(72) Inventors: Niklas Thorn, Stenungsund (SE); Daniel Nilsson, Stenungsund (SE); Johannes Thunberg, Stenungsund (SE); Annika Smedberg, Stenungsund (SE); Thomas Gkourmpis, Stenungsund (SE)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/282,081

(22) PCT Filed: Mar. 15, 2022

(86) PCT No.: PCT/EP2022/056754

§ 371 (c)(1),
(2) Date: Sep. 14, 2023

(87) PCT Pub. No.: WO2022/194897

PCT Pub. Date: Sep. 22, 2022

(65) Prior Publication Data

US 2024/0153666 A1 May 9, 2024

(30) Foreign Application Priority Data

Mar. 16, 2021 (EP) .................................... 21163001

(51) Int. Cl.

| | |
|---|---|
| ***H01B 3/44*** | (2006.01) |
| ***H01B 3/00*** | (2006.01) |
| ***H01B 13/14*** | (2006.01) |
| ***H01B 19/00*** | (2006.01) |

(52) U.S. Cl.

CPC ............ *H01B 3/447* (2013.01); *H01B 3/004* (2013.01); *H01B 3/441* (2013.01); *H01B 13/141* (2013.01); *H01B 13/148* (2013.01); *H01B 19/00* (2013.01)

(58) Field of Classification Search

CPC ..................................................... H01B 9/027

USPC ...................................... 174/102 SC, 120 SC

See application file for complete search history.

(56) References Cited

U.S. PATENT DOCUMENTS

| | | | | |
|---|---|---|---|---|
| 11,881,335 B2 * | 1/2024 | Skogman | C08K 3/04 | |
| 2007/0249765 A1 * | 10/2007 | Broman | C08K 5/3437 | 524/99 |
| 2009/0163631 A1 * | 6/2009 | Roos | C08K 3/24 | 524/424 |
| 2010/0179277 A1 * | 7/2010 | Soddemann | C08K 5/3447 | 525/367 |
| 2014/0199547 A1 * | 7/2014 | Jamieson | H01B 3/004 | 252/511 |

FOREIGN PATENT DOCUMENTS

| | | | |
|---|---|---|---|
| EP | 1065672 | A2 | 1/2001 |
| EP | 1548752 | A1 | 6/2005 |
| EP | 1630823 | A1 | 3/2006 |
| EP | 2628162 | A2 | 8/2013 |
| EP | 2886585 | A1 | 6/2015 |
| WO | 0062014 | A1 | 10/2000 |

OTHER PUBLICATIONS

International Search report and written opinion mailed Jun. 23, 2022 in PCT/EP2022/056754.

International Search report and written opinion mailed Jun. 23, 2022 in PCT/EP2022/056755.

* cited by examiner

*Primary Examiner* — Chau N Nguyen

(74) *Attorney, Agent, or Firm* — Meunier Carlin & Curfman LLC

(57) ABSTRACT

A semiconductive polymer composition comprising: (a) an ethylene C1-2-alkyl (meth)acrylate copolymer having an MFR2 of 4.5 g/10 min or more and a C1-2-alkyl (meth) acrylate content of at least 9.0 wt % based on the total weight of the ethylene C1-2-alkyl alkyl (meth)acrylate copolymer; (b) 35.0 to 48 wt % carbon black having an iodine adsorption number of 85 to 140 mg/g (ASTM D 1510-19a), an oil absorption number of 90 to 110 ml/100 g (ASTM D 2414-19) and an average primary particle size of 29 nm or less (ASTM D 3849-14a); and (c) 0.05 to 2.0 wt % of at least one antioxidant; all weight percentages being based on the total weight of the semiconductive polymer composition, unless mentioned otherwise.

21 Claims, No Drawings

SEMICONDUCTIVE POLYMER COMPOSITION

This invention relates to a semiconductive polymer composition comprising a polyethylene polymer and carbon black. In particular, the invention relates to a semi-conducting composition comprising an ethylene $C_{1-2}$-alkyl (meth) acrylate copolymer, a specific carbon black and an antioxidant as well as the use of that composition in the manufacture of a semiconductive shield for an electric power cable. The invention also relates to cables comprising said semiconductive polymer composition.

BACKGROUND OF THE INVENTION

Electric cables and particularly electric power cables for medium and high voltages are composed of a plurality of polymer based layers extruded around the electric conductor. The electric conductor is usually coated first with an inner semi-conducting layer (the conductor shield) followed by an insulating layer, then an outer semi-conducting layer (the insulation shield). To these layers further layers may be added, such as a water barrier layer and sheath layer(s).

The insulating layer normally comprises an LDPE (low density polyethylene, i.e. polyethylene prepared by radical polymerisation at a high pressure) which may be cross-linked by adding peroxide. The inner and outer semi-conducting layers normally comprises an ethylene copolymer, such as an ethylene-vinyl acetate copolymer (EVA) or ethylene alkyl (meth)acrylate copolymer with an amount of carbon black sufficient to make the composition semi-conducting.

There is a need to improve the smoothness of a semiconductive layer in a power cable. Inhomogeneities present in such layers can have detrimental effects on the performance of the power cable since an inhomogeneity or protrusion (a so called pip) will lead to a field enhancement and a weak point in the cable. It is therefore desirable to produce smoother semiconductive layers with cost competitive components.

It is also preferred if the semi-conducting layer has a high conductivity (low volume resistivity) to fulfil its purpose as a semi-conducting shield. Further, the semi-conducting composition should be easy to process into a semi-conducting shield layer. This means that the composition should have low viscosity when processed. The viscosity of the composition may be measured as the melt flow rate (MFR) of the composition, where a high MFR value means a low viscosity.

EP1630823 describes a semiconductive polymer composition comprising an olefin homo- or copolymer wherein the composition has a direct current volume resistivity of less than 1000 Ohm·cm at 90° C., an elongation at break which after aging for 240 hours at 135° C. does not change by more than 25%, and a total number of structures of 20 or less in the SIED test.

In EP1548752, a semi-conductive polymer composition is described which comprises an ethylene alkyl (meth)acrylate copolymer, a carbon black wherein the carbon black is a furnace black having a DBPA of 90-110 $cm^3$/100 g; an iodine adsorption number of 85-140 g/kg; and a particle size of less than 29 nm, and a TMQ antioxidant.

EP 2628162 describes semiconductive compositions containing a polyolefin, carbon black and antioxidant. In the examples of EP 2628162, an antioxidant is combined with EMA or EBA and with carbon black. The EMA used in the examples has too low MFR and MA content and is outside claim 1. Three carbon blacks are discussed in the examples EP 2628162. None meet the requirements of claim 1. EP 2628162 is silent on the improvement of smoothness when using the particular specific type of polymer defined in the present claims.

EP 1065672 describes a semiconductive composition comprising 25-45 wt % carbon black with (a) a particle size of at least 29 nm, (b) a tint strength of less than 100%, (c) a loss of volatiles at 950° C. in a nitrogen atmosphere of less than 1 wt %, (d) a DBP oil absorption of 80-300 $cm^3$/100 g, (e) a nitrogen surface adsorption area of 30-300 m2/g or an iodine adsorption number of 30-300 g/kg, (f) a CTAB surface area of 30-150 m2/g and (g) a ratio of property (e) to property (f) of greater than about 1.1.

The present inventors have now found that high levels of certain conductive carbon blacks, when combined with a particular ethylene $C_{1-2}$-alkyl (meth)acrylate copolymer, offer remarkable surface smoothness and good volume resistivity. The inventors employ a specific ethylene $C_{1-2}$-alkyl (meth)acrylate with high $MFR_2$ and high comonomer content and a high amount of carbon black to achieve an improved smoothness while still maintaining good volume resistivity.

SUMMARY OF THE INVENTION

Thus viewed from one aspect the invention provides semiconductive polymer composition comprising:

(a) an ethylene $C_{1-2}$-alkyl (meth)acrylate copolymer having an $MFR_2$ of 4.5 g/10 min or more (ISO 1133, 2.16 kg. 190° C.) and a $C_{1-2}$-alkyl (meth)acrylate content of at least 9.0 wt % based on the total weight of the ethylene $C_{1-2}$-alkyl alkyl (meth)acrylate copolymer;

(b) 35.0 to 48 wt % carbon black having an iodine adsorption number of 85 to 140 mg/g (ASTM D 1510-19a), an oil absorption number of 90 to 110 ml/100 g (ASTM D 2414-19) and an average primary particle size of 29 nm or less (ASTM D 3849-14a); and (c) 0.05 to 2.0 wt % of at least one antioxidant;

all weight percentages being based on the total weight of the semiconductive polymer composition, unless mentioned otherwise.

Viewed from another aspect the invention provides a process for the preparation of a semiconductive polymer composition as herein before defined comprising compounding components (a) to (c) at a temperature of 150 to 300° C., preferably via mixing;

and optionally pelletizing the composition.

In particular, compounding can be effected in a co-kneader.

Viewed from another aspect the invention provides a cable, such as a power cable, comprising a conductor which is surrounded by at least an inner semiconductive layer, an insulation layer and an outer semiconductive layer in that order;

wherein said inner and/or outer semiconductive layer comprises, e.g. consists of, a semiconductive polymer composition as herein before defined.

Viewed from another aspect the invention provides a process for producing a cable, such as a power cable, comprising a conductor surrounded by at least an inner semiconductive layer, an insulation layer and an outer semiconductive layer, in that order, wherein the process comprises the steps of extruding on a conductor an inner semiconductive layer, an insulation layer and outer semiconductive layer; and optionally crosslinking one or more of said inner semiconductive layer, insulation layer and outer semiconductive layer;

wherein said inner and/or outer semiconductive layer comprises, e.g. consists of, a semiconductive polymer composition as herein before defined.

Viewed from another aspect the invention provides the use of a semiconductive polymer composition as hereinbefore defined in the manufacture of the inner and/or outer semiconductive layer of a cable, such as a power cable.

Viewed from another aspect the invention provides the use of a semiconductive polymer composition comprising:

(a) an ethylene $C_{1-2}$-alkyl (meth)acrylate copolymer having an $MFR_2$ of 4.5 g/10 min or more and a $C_{1-2}$-alkyl (meth)acrylate content of at least 9.0 wt % based on the total weight of the ethylene $C_{1-2}$-alkyl alkyl (meth) acrylate copolymer;

(b) 35.0 to 48 wt % carbon black having an iodine adsorption number of 85 to 140 mg/g (ASTM D 1510-19a), an oil absorption number of 90 to 110 ml/100 g (ASTM D 2414-19) and an average primary particle size of 29 nm or less (ASTM D 3849-14a); and (c) 0.05 to 2.0 wt % of at least one antioxidant;

all weight percentages being based on the total weight of the semiconductive polymer composition unless mentioned otherwise; to increase the smoothness of a semiconductive shield layer prepared using said composition.

DETAILED DESCRIPTION OF INVENTION

This invention relates to a semiconductive polymer composition comprising an ethylene $C_{1-2}$-alkyl (meth)acrylate copolymer, a specific carbon black and an antioxidant. This composition offers semiconductive shields which are remarkably smooth with good volume resistivity.

Carbon Black

According to the present invention, the semiconductive polymer composition comprises a specific carbon black. It is possible to use a mixture of carbon blacks or a single carbon black. Ideally, a single carbon black is used. Any wt % referred to below refer to the total weight of carbon black present in the semiconductive polymer composition based on the total weight of the semiconductive polymer composition.

Preferably, the semiconductive polymer composition comprises 35.0 to 48 wt % carbon black. In further preferred embodiments, the amount of carbon black is 35.5 to 43 wt %, preferably 36 to 42 wt %, such as 37 to 42 wt %, more preferably 38 to 42 wt %, or especially 38.5 to 41 wt %, based on the total weight of the semiconductive polymer composition. In one embodiment the amount of carbon black is 38 to 40 wt % based on the total weight of the semiconductive polymer composition.

The carbon black used in the compositions of the invention is one that has an oil absorption number (OAN) of 90-110 ml/100 g; an iodine adsorption number ($I_2$) of 85-140 g/kg; and an average primary particle size of 29 nm or less. This carbon black has been found to work well in the semiconductive polymer composition of the invention and also has significant cost advantages compared to other speciality carbon blacks used for conductivity.

The carbon black is preferably a furnace black.

The presence of the carbon black ensures that the semiconductive polymer composition is semiconductive. A semiconductive polymer composition defined here preferably has a volume resistivity (VR) at 23° C. of less than 100 Ohm·cm, preferably less than 50 Ohm·cm, more preferably less than 25 Ohm·cm and even more preferably less than 10 Ohm·cm measured according to the test method described below. The volume resistivity (VR) may be more than 1.0 Ohm·cm.

The bulkiness of the carbon black can be expressed as the oil absorption number in ml/100 g (or $cm^3$/100 g) according to ASTM D 2414-19. The OAN number of the carbon black of the present invention is 90-110 ml/100 g, preferably 92-105 ml/100 g, more preferably 92-104 ml/100 g.

The surface area of the carbon black is expressed as the iodine adsorption ($I_2$) number in g/kg (or mg/g) according to ASTM D 1510-19a. The iodine adsorption number of the carbon black of the present invention is 85-140 g/kg, preferably 100-140 g/kg, and more preferably 110-135 g/kg.

The average primary particle size of the carbon black relates to the primary particle size and is expressed as the arithmetic mean particle diameter measured in nanometers (nm) with transmission electron microscopy according to ASTM D 3849-14a. The average primary particle size of the carbon black of the present invention is 29 nm or less, preferably 25 nm or less, more preferably 20 nm or less. The average primary particle size may be 10 nm or more.

In a preferred embodiment, the carbon black has an iodine adsorption number of 100 to 130 mg/g, an oil absorption number of 92 to 105 ml/100 g and an average primary particle size of 25 nm or less.

As preferred examples of carbon blacks according to the present invention may be mentioned Raven PFE ($I_2$=118 g/kg; OAN=100 ml/100 g; average primary particle size≤25 nm); and Printex Alpha A ($I_2$=118 g/kg; OAN=98 ml/100 g; average primary particle size≤20 nm).

Ethylene $C_{1-2}$alkyl (meth)acrylate copolymer

According to the present invention, the semiconductive polymer composition comprises a copolymer of ethylene and a $C_{1-2}$-alkyl (meth)acrylate comonomer. It is possible to use a mixture of ethylene $C_{1-2}$-alkyl (meth)acrylate copolymers. Ideally, a single ethylene $C_{1-2}$-alkyl (meth)acrylate copolymer is used. Any wt % referred to below refer to the total weight of ethylene $C_{1-2}$-alkyl (meth)acrylate copolymers present in the semiconductive polymer composition based on the total weight of the semiconductive polymer composition, unless mentioned otherwise.

The copolymer used in the semiconductive polymer composition is a copolymer of ethylene and an $C_{1-2}$-alkyl (meth)acrylate comonomer. The term (meth)acrylate implies either methacrylate or acrylate herein. It is preferred if the copolymer is an ethylene $C_{1-2}$-alkyl acrylate. There may be one or more $C_{1-2}$-alkyl (meth)acrylate comonomers, preferably one $C_{1-2}$-alkyl (meth)acrylate comonomer only. It is preferred if no non $C_{1-2}$-alkyl (meth)acrylate comonomers are present.

Further preferably, said comonomer(s) is selected from ethylene methyl acrylate (EMA) copolymer, ethylene methyl methacrylate (EMMA) copolymer, or ethylene ethyl acrylate (EEA) copolymer.

The use of ethylene methyl acrylate (EMA), or ethylene ethyl acrylate (EEA) is especially preferred.

The copolymer preferably comprises at least 9.0 wt %, preferably 9.0 to 25 wt %, more preferably 10 to 25 wt %, such as 10 to 22 wt %, especially 10.5 to 20 wt %, more especially 11 to 19.5 wt %, most especially 12 to 19 wt % of $C_{1-2}$-alkyl (meth)acrylate comonomer based on the total weight of the ethylene $C_{1-2}$-alkyl (meth)acrylate copolymer. The ethylene preferably forms the balance of the ethylene alkyl (meth)acrylate copolymer, i.e. there is preferably at least 75 wt % ethylene monomer present, such as 75 to 91 wt %, 75 to 90 wt %, 78 to 90 wt %, 80 to 89.5 wt %, 80.5 to 89 wt % or 81 to 88 wt % ethylene based on the total weight of the ethylene $C_{1-2}$-alkyl alkyl (meth)acrylate copolymer.

Preferably, the ethylene $C_{1-2}$-alkyl (meth)acrylate copolymer has a melt flow rate $MFR_2$ of 4.5 to 50 g/10 min, more preferably 4.5 to 30 g/10 min, even more preferably 4.5 to 25 g/10 min, and most preferably 4.5 to 22 g/10 min (ISO 1133, 2.16 kg. 190° C.). Most preferred ranges include 4.5 to 15 g/10 min, or 4.5 to 10 g/10 min, especially 5.0 to 12 g/10 min or more preferably 5.5 to 10 g/10 min.

In one embodiment, the ethylene alkyl (meth)acrylate copolymer comprises 10 to 20 wt % of said $C_{1-2}$-alkyl (meth)acrylate comonomer based on the total weight of the ethylene $C_{1-2}$-alkyl alkyl (meth)acrylate copolymer and has an $MFR_2$ of 4.5 to 15 g/10 min (determined using ISO 1133 190° C. and 2.16 kg load).

Any ethylene $C_{1-2}$-alkyl (meth)acrylate copolymer may have a density of 910 to 940 kg/$m^3$, preferably 915 to 940 kg/$m^3$, such as 920 to 940 kg/$m^3$.

The use of an ethylene methyl acrylate copolymer is preferred.

In one embodiment, the ethylene $C_{1-2}$-alkyl (meth)acrylate copolymer is a ethylene methyl acrylate copolymer or an ethylene ethyl acrylate copolymer having 16 to 22 wt % of ethyl acrylate comonomer, such as 16 to 20 wt % of ethyl acrylate comonomer based on the total weight of the ethylene $C_{1-2}$-alkyl (meth)acrylate copolymer.

In one embodiment, the ethylene $C_{1-2}$-alkyl (meth)acrylate copolymer is an ethylene ethyl acrylate copolymer having 16 to 22 wt % of ethyl acrylate comonomer such as 16 to 20 wt % of ethyl acrylate comonomer based on the total weight of the ethylene $C_{1-2}$-alkyl (meth)acrylate copolymer.

The ethylene $C_{1-2}$-alkyl (meth)acrylate copolymer can be produced by any conventional polymerisation process. Preferably, it is produced by radical polymerisation, such as high pressure radical polymerisation. High pressure polymerisation can be effected in a tubular reactor or an autoclave reactor. Preferably, it is a tubular reactor. In general, the pressure can be within the range of 1200-3500 bars and the temperature can be within the range of 150° C.-350° C. Further details about high pressure radical polymerisation are known in the art. Suitable ethylene $C_{1-2}$-alkyl (meth) acrylate copolymers are available commercially from well-known suppliers.

The balance of the semiconductive polymer composition is formed by the ethylene $C_{1-2}$-alkyl (meth)acrylate copolymer once other components have been considered. The semiconductive polymer composition preferably comprises at least 51 wt %, such as at least 53 wt % of said ethylene $C_{1-2}$-alkyl (meth)acrylate copolymer such as 52 to 64.95 wt % based on the total weight of the semiconductive polymer composition. In further preferred embodiments, the amount of ethylene $C_{1-2}$-alkyl (meth)acrylate copolymer is 54 wt % or more, such as 58 wt % or more based on the total weight of the semiconductive polymer composition.

In one embodiment, the ethylene $C_{1-2}$-alkyl (meth)acrylate copolymer has an $MFR_2$ of 4.5 to 15 g/10 min and the carbon black has an average primary particle size of 25 nm or less.

Antioxidant

As antioxidant, sterically hindered or semi-hindered phenols, aromatic amines, aliphatic sterically hindered amines, organic phosphates, thio compounds, polymerized 2,2,4-trimethyl-1,2-dihydroquinoline and mixtures thereof, can be mentioned.

Preferably, the antioxidant is selected from the group of diphenyl amines and diphenyl sulfides. The phenyl substituents of these compounds may be substituted with further groups such as alkyl, alkylaryl, arylalkyl or hydroxy groups.

Preferably, the phenyl groups of diphenyl amines and diphenyl sulfides are substituted with tert.-butyl groups, preferably in meta or para position, which may bear further substituents such as phenyl groups.

More preferred, the antioxidant is selected from the group of 4,4'-bis(1,1'dimethylbenzyl)diphenylamine, para-oriented styrenated diphenylamines, 6,6'-di-tert.-butyl-2,2'-thiodi-p-cresol, 4,4'-thiobis (2-tert.butyl-5-methylphenol), tris(2-tert.-butyl-4-thio-(2'-methyl-4'hydroxy-5'-tert.-butyl)phenyl-5-methyl)phenylphosphite, polymerized 2,2,4-trimethyl-1,2-dihydroquinoline, or derivatives thereof.

Of course, not only one of the above-described antioxidants may be used but also any mixture thereof.

The amount of antioxidant, optionally a mixture of two or more antioxidants, can range from 0.05 to 2.0 wt-%, more preferably from 0.10 to 1.5 wt-%, even more preferably from 0.15 to 0.80 wt % based on the total weight of the semiconductive polymer composition. Most especially, there is 0.2 to 0.7 wt % of antioxidant based on the total weight of the semiconductive polymer composition.

The semiconductive polymer composition of the invention may comprises the specific antioxidant 4,4'-bis(1,1'-dimethylbenzyl)diphenylamine or 2,2,4-Trimethyl-1,2-dihydroquinoline polymer.

Other Components

The semiconductive polymer composition may comprise further additives. As possible additives, scorch retarders, crosslinking boosters, stabilisers, processing aids, flame retardant additives, acid scavengers, inorganic fillers, voltage stabilizers, additives for improving water tree resistance, or mixtures thereof can be mentioned.

A "scorch retarder" is defined to be a compound that reduces premature crosslinking i.e. the formation of scorch during extrusion. Besides scorch retarding properties, the scorch retarder may simultaneously result in further effects like boosting, i.e. enhancing crosslinking performance.

Useful scorch retarders can be selected from substituted or unsubstituted diphenylethylene, quinone derivatives, hydroquinone derivatives, monofunctional vinyl containing esters and ethers, or mixtures thereof. More preferably, the scorch retarder is selected from substituted or unsubstituted diphenylethylene, or mixtures thereof. A highly preferred option is 2,5-di-tert.butyl hydroquinone or 2,4-diphenyl-4-methyl-1-pentene, especially 2,4-diphenyl-4-methyl-1-pentene.

Preferably, the amount of scorch retarder is within the range of 0.005 to 1.0 wt %, more preferably within the range of 0.01 to 0.8 wt %, based on the total weight of the semiconductive polymer composition.

Typical cross-linking boosters may include compounds having an allyl group, e.g. triallylcyanurate, triallylisocyanurate, and di-, tri- or tetraacrylates.

Peroxide—Semiconductive Polymer Composition

A peroxide is preferably added to the semiconductive polymer composition in an amount of less than 3.0 wt %, more preferably 0.1 to 2.0 wt %, even more preferably 0.3 to 1.5 wt %, yet even more preferably 0.4 to 1.1 wt %, especially 0.5 to 0.8 wt % based on the total weight of the semiconductive polymer composition. Where a blend of peroxides is used then this percentage refers to the sum of the peroxides present.

The peroxide may be added to the semiconductive polymer composition during the compounding step (i.e. when the polymer is mixed with the carbon black), or after the compounding step in a separate process, or when the semiconductive polymer composition is extruded.

As peroxides, the following compounds can be mentioned:

di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-di(tert-butylperoxy)-valerate, 1,1-di(tert-butylperoxy)-3,3,5-trimethylcyclohexane, tert-butylperoxybenzoate, dibenzoylperoxide, di(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof.

Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof.

In one embodiment, the semiconductive polymer composition is free of peroxide.

In one embodiment, the semiconductive polymer composition consists of:

(a) an ethylene $C_{1-2}$-alkyl (meth)acrylate copolymer having an $MFR_2$ of 4.5 g/10 min or more and a $C_{1-2}$-alkyl (meth)acrylate content of at least 9.0 wt % based on the total weight of the ethylene $C_{1-2}$-alkyl (meth)acrylate copolymer;

(b) 35.0 to 48 wt % carbon black having an iodine adsorption number of 85 to 140 mg/g (ASTM D 1510-19a), an oil absorption number of 90 to 110 ml/100 g (ASTM D 2414-19) and an average primary particle size of 29 nm or less (ASTM D 3849-14a); and (c) 0.05 to 2.0 wt % of at least one antioxidant;

all weight percentages being based on the total weight of the semiconductive polymer composition, unless mentioned otherwise.

In embodiments wherein the semiconductive polymer composition is a crosslinkable composition, it may also comprise a crosslinking agent such as a peroxide.

In one embodiment, the semiconductive polymer composition consists of:

(a) an ethylene $C_{1-2}$-alkyl (meth)acrylate copolymer having an $MFR_2$ of 4.5 g/10 min or more and a $C_{1-2}$-alkyl (meth)acrylate content of at least 9.0 wt % based on the total weight of the ethylene $C_{1-2}$-alkyl (meth)acrylate copolymer;

(b) 35.0 to 48 wt % carbon black having an iodine adsorption number of 85 to 140 mg/g (ASTM D 1510-19a), an oil absorption number of 90 to 110 ml/100 g (ASTM D 2414-19) and an average primary particle size of 29 nm or less (ASTM D 3849-14a);

(c) 0.05 to 2.0 wt % of at least one antioxidant; and (d) 0.1 to 2.0 wt % of a crosslinking agent such as a peroxide all weight percentages being based on the total weight of the semiconductive polymer composition, unless mentioned otherwise.

Preparation of the Semiconductive Polymer Composition

The semi-conducting polymer composition may be prepared by incorporating the carbon black, antioxidant and any additives into the base ethylene $C_{1-2}$-alkyl (meth)acrylate copolymer. This is preferably done by compounding the base polymer, the carbon black, antioxidant and any additives in a compounding apparatus such as a Banbury mixer, co-kneader or a single or twin screw extruder.

The process for mixing and/or blending (e.g. compounding) components (a) to (c) may occur at a temperature below 300° C. Preferable temperature ranges include 155 to 280° C., such as 160 to 260° C.

This mixing at elevated temperature is typically referred to as melt mixing, and will usually occur at more than 10° C. above, preferably more than 25° C., above the melting point of the polymer component(s) and below the degradation temperature of components.

Preferably the preparation process further comprises a step of pelletising the obtained polymer composition. Pelletising can be affected in well-known manner using a conventional pelletising equipment, such as preferably conventional pelletising extruder which is integrated to said mixer device.

According to one embodiment, the semi-conducting polymer composition according to the present invention is prepared using a co-kneader as the mixing apparatus comprising a mixer barrel in which the melt-mixing of the composition is carried out, e.g. with one inlet hopper for adding polymer, with one or more inlet hoppers for adding the carbon black, and a discharge extruder or gear pump arranged downstream of the mixer barrel.

The co-kneader may be a single-screw machine comprising an axial oscillation once per revolution, where static pins in a mixer house of the apparatus interact with gaps in the screw. Hereby, an elongational kneading, which provides efficient dispersive and distributive mixing in a relatively short barrel, is provided. Temperature can be controlled by adding the carbon black to the polymer melt in one or more hoppers.

The inventors have found that co-kneading compounding may further affect the smoothness positively. Compared to a batch wise or twin screw process, a co-kneading process offers improved cost efficiency but also a lower risk of contaminants entering the semiconductive polymer composition, which could cause a decreased smoothness, and a lower risk of negatively affecting critical carbon black characteristics such as carbon black structure with a resultant negative effect on conductivity and dispersibility (and consequently also a decreased smoothness). The use of a BUSS co-kneader is preferred.

Cables can then be prepared from the semiconductive polymer composition as required.

Conductor

The cable of the invention comprises a conductor. The conductor can be made from any suitable conductive metal, typically copper or aluminium.

Cable

A further embodiment of the present invention provides a cable (e.g. a power cable), comprising at least one layer, wherein said layer comprises the semiconductive polymer composition as described herein.

The layer may comprise at least 50 wt % of the semiconductive polymer composition, such as at least 60 wt %, especially at least 80 wt %, such as at least 90 wt % of the semiconductive polymer composition based on the total weight of the layer.

A further embodiment of the present invention provides a layer in a multi-layer cable, such as a power cable layer, wherein said layer comprises the semiconductive polymer composition as described herein. The multi-layer cable may e.g. have at least 3 layers, such as e.g. an inner semiconductive layer, an outer semiconductive layer, and an insulation layer arranged there between.

The at least one layer of the cable comprising the semiconductive polymer composition is preferably a semiconductive layer.

Ideally, the cable will comprise a conductor surrounded by at least an inner semiconductive layer, an insulation layer and an outer semiconductive layer in given order, wherein the semiconductive layer(s) comprise, preferably consist of, the semiconductive polymer composition as described herein. It is within the ambit of the invention for the semiconductive polymer composition of the inner and outer semiconductive layer to be identical or different.

According to another embodiment of a power cable, the semiconductive layer(s) may be strippable or non-strippable, preferably non-strippable, i.e. bonded. These terms are known and describe the peeling property of the layer, which may be desired or not depending on the end application. Thus, according to at least one example embodiment, said layer is a bonded layer in said multi-layer cable.

The cable of the invention is preferably a power cable selected from a MV, HV or EHV cable. The cable is preferably a MV cable, HV cable or EHV cable.

Insulating layers for medium or high voltage power cables generally have a thickness of at least 2 mm, typically of at least 2.3 mm, and the thickness increases with increasing voltage the cable is designed for.

As well known the cable can optionally comprise further layers, e.g. layers surrounding the insulation layer or, if present, the outer semiconductive layers, such as screen(s), a jacketing layer(s), other protective layer(s) or any combinations thereof.

The cable of the invention may be crosslinkable. Accordingly, further preferably the cable is a crosslinked cable, wherein at least one semiconductive layer comprises crosslinkable polymer composition of the invention which is crosslinked before the subsequent end use.

The most preferred cable of the invention is a power cable which is preferably crosslinkable. Such a power cable ideally comprises a conductor surrounded by at least an inner semiconductive layer, an insulation layer and an outer semiconductive layer in given order, wherein the semiconductive layer(s) comprises, preferably consists of, the semiconductive polymer composition as described herein. Preferably at least the inner semiconductive layer comprises the polymer composition of the invention, as defined above or below, or in claims, including the preferred embodiments thereof. In this preferred embodiment of cable, the outer semiconductive layer may optionally comprise the polymer composition of the invention which can be identical or different from the polymer composition of the inner semiconductive layer. Moreover, at least the polymer composition of the invention of the inner semiconductive layer is crosslinkable, preferably peroxide crosslinkable, and is crosslinked before the subsequent end use. Preferably also the insulation layer is crosslinkable and is crosslinked before the subsequent end use.

In one embodiment, the cable of the invention is a power cable which is non-crosslinked or non-crosslinkable comprising at least one non-crosslinked or non-crosslinkable inner/outer semiconductive or insulation layer.

The invention further provides a process for producing a cable, preferably a power cable, wherein the process comprises the steps of:

applying on one or more conductors, a layer comprising a semiconductive polymer composition as defined herein. A cable can be produced by the process comprising the steps of:

(a) providing and mixing, for example, melt mixing in an extruder, a crosslinkable first semiconductive polymer composition for the inner semiconductive layer,
   - providing and mixing, for example, melt mixing in an extruder, a crosslinkable insulation composition for the insulation layer,
   - providing and mixing, for example, melt mixing in an extruder, a second semiconductive polymer composition for the outer semiconductive layer, (b) applying on a conductor, for example, by co-extrusion,
   - a melt mix of the first semiconductive polymer composition obtained from step (a) to form the inner semiconductive layer,
   - a melt mix of insulation layer composition obtained from step (a) to form the insulation layer, and
   - a melt mix of the second semiconductive polymer composition obtained from step (a) to form the outer semiconductive layer, and (c) optionally crosslinking at crosslinking conditions one or more of the insulation layer, the inner semiconductive layer and the outer semiconductive layer, of the obtained cable.

One or both of the inner and/or outer semiconductive layers are produced using the semiconductive polymer composition of the invention.

Moreover said first and second semiconductive polymer compositions may, for example, be identical.

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one extrusion head, or sequentially using more than one extrusion heads.

As well known a meltmix of the polymer composition or component(s) thereof, is applied to form a layer. The mixing step can be carried out in the cable extruder. The meltmixing step may comprise a separate mixing step in a separate mixer, e.g. kneader, arranged in connection and preceding the cable extruder of the cable production line. Mixing in the preceding separate mixer can be carried out by mixing with or without external heating (heating with an external source) of the component(s).

All or part of the optional other component(s), such as further polymer component(s) or additive(s) can be present in the polymer composition before providing to the mixing step (i) of the cable preparation process or can be added, e.g. by the cable producer, during the mixing step (i) of the cable production process.

If, and preferably, the polymer composition is crosslinked after cable formation, then the crosslinking agent is preferably a peroxide, which can be mixed with the components of the polymer composition before or during mixing step (i). Preferably, the crosslinking agent, preferably peroxide, is impregnated to the solid polymer pellets of the polymer composition. The obtained pellets are then provided to the cable production step.

Most preferably, the polymer composition of the invention is provided to the mixing step (i) of the cable production process in a suitable product form, such as a pellet product.

As mentioned, the polymer composition is preferably crosslinkable and preferably the pellets of the polymer composition comprise also the peroxide before providing to the cable production line.

In above crosslinking process step (iii) of the invention crosslinking conditions can vary depending i.e. on the used crosslinking method, and cable size. The crosslinking of the invention is effected e.g. in a known manner preferably in an elevated temperature. A skilled person can choose the suitable crosslinking conditions e.g. for crosslinking via radical reaction or via hydrolysable silane groups. As non-limiting example of a suitable crosslinking temperature range, e.g. at least 150° C. and typically not higher than 360° C.

Insulation Layer

The cable of the invention comprises an insulation layer. Preferably this insulation layer comprises an LDPE homopolymer and/or copolymer such as an LDPE copolymer and optionally a peroxide. The insulation layer may comprise a mixture of LDPE homopolymer and/or copolymers such as LDPE copolymers.

The LDPE is preferably an LDPE homopolymer or an LDPE copolymer with at least one polyunsaturated comonomer. In one embodiment, the LDPE of the insulation layer is not an ethylene alkyl (meth)acrylate copolymer.

If the LDPE homopolymer or copolymer is a copolymer such as an LDPE copolymer, it preferably comprises at least one polyunsaturated comonomer and optionally with one or more other comonomer(s). Preferably, the LDPE copolymer is a binary copolymer of ethylene and one polyunsaturated comonomer only. The polyunsaturated comonomer may be a diene such as 1,7-octadiene, 1,9-decadiene, 1,11-dodecadiene, 1,13-tetradecadiene, 7-methyl-1,6-octadiene, 9-methyl-1,8-decadiene, or mixtures thereof, e.g., from 1,7-octadiene, 1,9-decadiene, 1,11-dodecadiene, 1,13-tetradecadiene, or any mixture thereof.

The invention will now be described with reference to the following non limiting examples. In the examples all percentages and parts are by weight, unless otherwise stated.

Determination Methods

Unless otherwise stated in the description or experimental part the following methods were used for the property determinations.

Wt %: % by Weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-1/method A. The sample preparation was executed according to ISO 1872-2 Table 3 Q (compression moulding).

Oil Absorption Number

Oil Absorption number in ml/100 g is measured according to ASTM D 2414-19.

Iodine Adsorption Number

The iodine adsorption no. is expressed in g/kg and measured according to ASTM D 1510-19a.

Average Primary Particle Size

The average primary particle size of the carbon black is expressed as the mean particle size measured in nanometers (nm) with transmission electron microscopy according to ASTM D 3849-14a.

Volume Resistivity

The volume resistivity (VR) was measured on plaques. Pellets were compression moulded into a specimen of 3 mm thickness (h) in a hot press using the following program: 1 minute at 120° C.; 4 minutes linear ramp-up to 180° C.; 26 minutes at 180° C.; cooling 15° C./min down to 35° C. using a constant pressure at ~600 N/cm2. From the pressed plaque, a specimen was punched out having a 25 mm width (w) and a 160 mm length. The specimen was oven dried for ~5 h at 60° C. and subsequently kept in a desiccator for a minimum of 16 h. For the actual volume resistivity (VR) measurement, electrodes were attached to the sample with a 130 mm gap. In order to compensate for so called contact resistance, two more electrodes were attached 10 mm further out from the measurement electrodes. The electrodes were connected to an apparatus that can provide the resistance (R) between the electrodes (e.g. multimeter or VOM-device). The resistance R was measured in ohms. The volume resistivity (VR) was then calculated by multiplying the resistance (R) with the cross-sectional area (A) wherein A=h*w (3*25 mm) of the specimen, divided by the length (L) between the electrodes (130 mm) or VR=R*A/L Comonomer Content Comonomer content (wt %) was determined in a known manner based on Fourier transform infrared spectroscopy (FTIR) determination calibrated with quantitative nuclear magnetic resonance (NMR) spectroscopy.

Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene. An FTIR peak height ratio was correlated to the polar comonomer content by reference materials determined by NMR. The NMR spectroscopy calibration procedure was undertaken in the conventional manner which is well documented in the literature.

Quantification of polar comonomer content in in polymers by NMR spectroscopy:

The polar comonomer content was determined by quantitative nuclear magnetic resonance (NMR) spectroscopy after basic assignment (e.g. “NMR Spectra of Polymers and Polymer Additives”, A. J. Brandolini and D. D. Hills, 2000, Marcel Dekker, Inc. New York). Experimental parameters were adjusted to ensure measurement of quantitative spectra for this specific task (e.g “200 and More NMR Experiments: A Practical Course”, S. Berger and S. Braun, 2004, Wiley-VCH, Weinheim). Quantities were calculated using simple corrected ratios of the signal integrals of representative sites in a manner known in the art.

Below is exemplified the determination of the polar comonomer content of ethylene ethyl acrylate, ethylene butyl acrylate and ethylene methyl acrylate.

The weight-% can be converted to mol-% by calculation. It is well documented in the literature.

(1) Ethylene Copolymers Containing Butyl Acrylate

Film samples of the polymers were prepared for the FTIR measurement: 0.5-0.7 mm thickness was used for ethylene butyl acrylate >6 wt % butylacrylate content and 0.05 to 0.12 mm thickness was used for ethylene butyl acrylate <6 wt % butylacrylate content.

After the FT-IR analysis the maximum absorbance for the peak for the butyl acrylate >6 wt % at 3450 $cm^{-1}$ was subtracted with the absorbance value for the base line at 3510 $cm^{-1}$ ($A_{butylacrylate}-A_{3510}$). Then the maximum absorbance peak for the polyethylene peak at 2020 $cm^{-1}$ was subtracted with the absorbance value for the base line at 2120 $cm^{-1}$ ($A_{2020}-A_{2120}$). The ratio between ($A_{butylacryiate}-A_{3510}$) and ($A_{2020}-A_{2120}$) was then calculated in the conventional manner which is well documented in the literature.

The maximum absorbance for the peak for the comonomer butylacrylate <6 wt % at 1165 $cm^{-1}$ was subtracted with the absorbance value for the base line at 1865 $cm^{-1}$ ($A_{butyl\ acrylate}-A_{1865}$). Then the maximum absorbance peak for polyethylene peak at 2660 $cm^{-1}$ was subtracted with the absorbance value for the base line at 1865 $cm^{-1}$ ($A_{2860}-A_{1865}$). The ratio between ($A_{butyl\ acrylate}-A_{1865}$) and ($A_{2660}-A_{1865}$) was then calculated.

(2) Ethylene Copolymers Containing Ethyl Acrylate

Film samples of the polymers were prepared for the FTIR measurement: 0.5 mm thickness was used for ethylene ethyl acrylate.

After the FT-IR analysis the maximum absorbance for the peak for the ethyl acrylate at 3450 $cm^{-1}$ with linear baseline correction applied between approximately 3205 and 3295 $cm^{-1}$ ($A_{ethylacrylate}$) was determined. Then the maximum absorbance peak for the polyethylene peak at 2020 $cm^{-1}$ with linear baseline correction applied between approximately 1975 and 2120 $cm^{-1}$ was determined (A 2020). The ratio between ($A_{ethylacrylate}$) and (A 2020) was then calculated in the conventional manner which is well documented in the literature.

(3) Ethylene Copolymers Containing Methyl Acrylate

Film samples of the polymers were prepared for the FTIR measurement: 0.1 mm thickness was used for ethylene methyl acrylate >8 wt % methyl acrylate content and 0.05 mm thickness was used for ethylene methyl acrylate <8 wt % methyl acrylate content.

After the analysis the maximum absorbance for the peak for the methyl acrylate >8 wt % at 3455 $cm^{-1}$ was subtracted with the absorbance value for the base line at 3510 $cm^{-1}$ ($A_{methylacrylate}-A_{3510}$). Then the maximum absorbance peak for the polyethylene peak at 2675 $cm^{-1}$ was subtracted with the absorbance value for the base line at 2450 $cm^{-1}$ ($A_{2675}-A_{2450}$). The ratio between ($A_{methylacrylate}-A_{3510}$) and ($A_{2575}-A_{2450}$) was then calculated in the conventional manner which is well documented in the literature.

The maximum absorbance for the peak for the comonomer methyl acrylate <8 wt % at 1164 $cm^{-1}$ was subtracted with the absorbance value for the base line at 1850 $cm^{-1}$ ($A_{methyl\ acrylate}-A_{1850}$). Then the maximum absorbance peak for polyethylene peak at 2665 $cm^{-1}$ was subtracted with the absorbance value for the base line at 1850 $cm^{-1}$ ($A_{2665}-A_{1850}$). The ratio between ($A_{methyl\ acrylate}-A_{1850}$) and ($A_{2665}-A_{1850}$) was then calculated.

Surface Smoothness:

Surface Smoothness Analysis (SSA) method uses a tape sample consisting of the semiconductive polymer composition as described below, and is a well-known method used in the prior art for determining the surface smoothness of semiconductive polymer materials.

Surface Smoothness Analysis (SSA) is designed to measure and record surface irregularities, called pips, on the extruded semiconductive material. The SSA equipment measures and sorts pips of different sizes based on the half-height width. The principle of detection of pips with SSA is measurement of the tape shadow over a horizon. The extruded tape passes a shear pin which is illuminated from one side with a light source. If a pip or other defect occur on the surface it gives rise to a shadow which is recorded on a one-dimensional camera located on the other side of the tape. The camera consists of light-sensitive pixels which measure the height and width of the defect. The height of the amount of light that passes the horizon and the width by the number of pixels that are shaded are recorded and detected as pips. Detected pips are reported in the magnitude of half-height width (W50) and height (h) in different size with the unit number of pips per square parsed tape (no/m2). The definition of half-height width is the width the pips have at half the height. The test system, provided by Semyre Photonic Systems AB, Sweden, is further generally described e.g. in WO0062014 of Semyre.

Tape Sample Preparation:

About 4 kg of pellets of the semiconductive polymer composition were taken and extruded into a form of tape sample using Collin single screw of 20 mm and 25D extruder (supplier Collin) and following temperature settings at different sections, starting from the inlet of the extruder: 95° C., 120° C., 120° C. and 125° C. to obtain a temperature of 125° C. of the polymer melt. The pressure before the extrusion plate is typically 260 bar (26 MPa), residence time is kept between 1 and 3 minutes and typical screw speed is 50 rpm, depending on the polymer material as known for a skilled person. Extruder die opening: 30 mm×1 mm, thickness of the tape: 500±20 μm, width of the tape: 18 mm.

The scanning results are for 1 $m^2$ area of tape and expressed as:

- number of particles per $m^2$ having a width larger than 0.15 mm at a half height of said particle protruding from the tape surface (=baseline),
- number of particles per $m^2$ having a width larger than 0.20 mm at a half height of said particle protruding from the tape surface (=baseline), and
- number of particles per $m^2$ having a width larger than 0.30 mm at a half height of said particle protruding from the tape surface (=baseline).
- number of particles per $m^2$ having a width larger than 0.50 mm at a half height of said particle protruding from the tape surface (=baseline).
- number of particles per $m^2$ having a width larger than 1 mm at a half height of said particle protruding from the tape surface (=baseline).

Carbon Black Content by TGA

Thermogravimetric Analysis (TGA) experiments were performed with a Mettler Toledo TGA/DSC 3+. Approximately 20-30 mg of materials were placed in an alumina crucible. The temperature was equilibrated at 40° C. for 10 minutes, and afterwards raised to 550° C. under nitrogen at 20° C./min. Afterwards the gas was switched to oxygen and the temperature was raised to 1000° C. The weight loss in this final step was assigned to carbon black.

Example 1

The inventive example and the comparative example have been prepared on the same type of compounding equipment.

The compositions in Table 1 were compounded on an X-Compound CK45 machine at a throughput of 25 kg/h and rotational speed of 300 rpm and were then pelletised.

The Following Copolymers are Used:

- Ethylene ethyl acrylate copolymer (EEA1) EA content of 15 wt % and a $MFR_2$=7.5 g/10 min.
- Ethylene ethyl acrylate copolymer (EEA2) EA content of 18 wt % and a $MFR_2$=7.5 g/10 min.
- Ethylene methyl acrylate copolymer (EMA1) EA content of 13 wt % and a $MFR_2$=9 g/10 min.
- Ethylene butyl acrylate copolymer (EBA1) EA content of 17 wt % and a $MFR_2$=7.5 g/10 min.

The carbon black used in the semiconductive polymer compositions has the following carbon black features:

Iodine adsorption number=118 mg/g,

OAN=98 ml/100 g

An average primary particle size of ≤20 nm.

The inventive and comparative compositions, the amounts of antioxidant that were added and the amounts of carbon black (CB) are described in Table 1. The amount of carbon black was determined via TGA analysis as described above.

TABLE 1

| Feature | Inv 1 | Inv 2 | Inv 3 | Comp 1 | Comp 2 |
|---|---|---|---|---|---|
| Polymer | EMA1 | EEA1 | EEA2 | EBA1 | EBA1 |
| Comonomer type | MA | EA | EA | BA | BA |
| Comonomer content (wt %) | 13 | 15 | 18 | 17 | 17 |
| $MFR_2$ (g/10 min) | 9 | 7.5 | 6 | 7-8 | 7-8 |
| Composition | | | | | |
| VR 23° C. (Ωcm) | n/a | 3.4 | n/a | 4.8 | 6.5 |
| CB content (wt %) | 39.3 | 39.8 | 39.5 | 39.1 | 34.7 |
| Antioxidant | TMQ | TMQ | TMQ | TMQ | TMQ |
| Antioxidant (wt %) | 0.65 | 0.65 | 0.65 | 0.65 | 0.65 |

TMQ: 2,2,4-Trimethyl-1,2-Dihydroquinoline polymer

The surface smoothness results are summarised in Table 2.

TABLE 2

| Pip size class (mm) | Inv 1 | Inv 2 | Inv 3 | Comp 1 | Comp 2 |
|---|---|---|---|---|---|
| >0.15 | 23 | 89 | 19 | 78 | 176 |
| >0.20 | 4 | 12 | 3 | 22 | 42 |
| >0.30 | 1 | 2 | 2 | 3 | 4 |
| >0.50 | 0 | 0 | 2 | 0 | 2 |
| >1.0 | 0 | 0 | 2 | 0 | 1 |

As can be seen the inventive semiconductive polymer compositions both have an improved smoothness level as well as an improved lower VR value compared to the comparative compositions.

The invention claimed is:

1. A semiconductive polymer composition comprising:

(a) an ethylene $C_{1-2}$-alkyl (meth)acrylate copolymer having an $MFR_2$ of 4.5 g/10 min to 15 g/10 min (ISO 1133, 2.16 kg. 190° C.) and a $C_{1-2}$-alkyl (meth)acrylate content of at least 9.0 wt % based on the total weight of the ethylene $C_{1-2}$-alkyl (meth)acrylate copolymer;

(b) 36 to 48 wt % carbon black having an iodine adsorption number of 100 to 130 mg/g (ASTM D 1510-19a), an oil absorption number of 92 to 105 ml/100 g (ASTM D 2414-19) and an average primary particle size of 25 nm or less (ASTM D 3849-14aa); and (c) 0.05 to 2.0 wt % of at least one antioxidant;

all weight percentages being based on the total weight of the semiconductive polymer composition, unless mentioned otherwise.

2. The semiconductive polymer composition as claimed in claim 1, wherein the ethylene $C_{1-2}$-alkyl (meth)acrylate copolymer is ethylene methyl acrylate, or ethylene ethyl acrylate.

3. The semiconductive polymer composition as claimed in claim 1, comprising at least 55 wt % of said ethylene $C_{1-2}$-alkyl (meth)acrylate copolymer based on the total weight of the semiconductive polymer composition.

4. The semiconductive polymer composition as claimed in claim 1, wherein said ethylene $C_{1-2}$-alkyl (meth)acrylate copolymer comprises 10 to 20 wt % of an alkyl (meth) acrylate comonomer.

5. The semiconductive polymer composition as claimed in claim 1, wherein the $MFR_2$ of said ethylene $C_{1-2}$-alkyl (meth)acrylate copolymer is 5.0 to 12 g/10 min (determined using ISO 1133 190° C. and 2.16 kg load).

6. The semiconductive polymer composition as claimed in claim 1, wherein said carbon black forms 36 to 45 wt % of the semiconductive polymer composition, based on the total weight of the semiconductive polymer composition.

7. The semiconductive polymer composition as claimed in claim 1, further comprising 0.1 to 2.0 wt-% peroxide based on the total weight of the semiconductive polymer composition.

8. The semiconductive polymer composition as claimed in claim 1, the semiconductive polymer composition having a volume resistivity (VR) at 23° C. of less than 100 Ohm·cm.

9. A process for the preparation of the semiconductive polymer composition as claimed in claim 1, the process comprising:

compounding components (a) to (c) at a temperature of 150 to 300° C.;

and optionally pelletizing the composition.

10. The process as claimed in claim 9, wherein compounding components (a) to (c) is via mixing.

11. A cable comprising:

a conductor which is surrounded by at least an inner semiconductive layer, an insulation layer and an outer semiconductive layer in that order;

wherein said inner and/or outer semiconductive layer comprises the semiconductive polymer composition as defined in claim 1.

12. The cable as claimed in claim 11, wherein said inner and/or outer semiconductive layer comprising the semiconductive polymer composition is not crosslinked.

13. The cable as claimed in claim 11, wherein said inner and/or outer semiconductive layer consists of the semiconductive polymer composition.

14. A process for producing a cable comprising a conductor surrounded by at least an inner semiconductive layer, an insulation layer and an outer semiconductive layer, in that order, wherein the process comprises the steps of extruding on the conductor the inner semiconductive layer, the insulation layer and outer semiconductive layer; and optionally crosslinking one or more of said inner semiconductive layer, insulation layer and outer semiconductive layer;

wherein said inner and/or outer semiconductive layer comprises the semiconductive polymer composition as defined in claim 1.

15. A method of use of a semiconductive polymer composition as defined in claim 1, the method comprising using the semiconductive polymer composition in the manufacture of an inner and/or outer semiconductive layer of a cable.

16. The semiconductive polymer composition as claimed in claim 1, comprising from 55 to 65.95% of said ethylene $C_{1-2}$-alkyl (meth)acrylate copolymer, based on the total weight of the semiconductive polymer composition.

17. The semiconductive polymer composition as claimed in claim 1, wherein said ethylene $C_{1-2}$-alkyl (meth)acrylate copolymer comprises an $MFR_2$ of 6.5 to 10 g/10 min (determined using ISO 1133 190° C. and 2.16 kg load).

18. The semiconductive polymer composition as claimed in claim 1, wherein said carbon black forms 37 to 41 wt % of the semiconductive polymer composition, based on the total weight of the semiconductive polymer composition.

19. The semiconductive polymer composition as claimed in claim 1, wherein the antioxidant is polymerized 2,2,4-trimethyl-1,2-dihydroquinoline.

20. A method of use of a semiconductive polymer composition comprising:

(a) an ethylene $C_{1-2}$-alkyl (meth)acrylate copolymer having an $MFR_2$ of 4.5 g/10 min to 15 g/10 min and a $C_{1-2}$-alkyl (meth)acrylate content of at least 9.0 wt %; based on the total weight of the ethylene $C_{1-2}$-alkyl (meth)acrylate copolymer;

(b) 36 to 48 wt % carbon black having an iodine adsorption number of 100 to 130 mg/g (ASTM D 1510-19a), an oil absorption number of 92 to 105 ml/100 g (ASTM D 2414-19) and an average primary particle size of 25 nm or less (ASTM D 3849-14aa); and (c) 0.05 to 2.0 wt % of at least one antioxidant, wherein the antioxidant is polymerized 2,2,4-trimethyl-1,2-dihydroquinoline;

all weight percentages being based on the total weight of the semiconductive polymer composition unless mentioned otherwise;

the method comprising using the semiconductive polymer composition to increase the smoothness of a semiconductive shield layer prepared using said composition.

21. A semiconductive polymer composition comprising:

(a) an ethylene $C_{1-2}$-alkyl (meth)acrylate copolymer having an $MFR_2$ of 4.5 g/10 min to 15 g/10 min (ISO 1133, 2.16 kg. 190° C.) and a $C_{1-2}$-alkyl (meth)acrylate content of at least 9.0 wt % based on the total weight of the ethylene $C_{1-2}$-alkyl (meth)acrylate copolymer;

(b) 36 to 48 wt % carbon black having an iodine adsorption number of 100 to 130 mg/g (ASTM D 1510-19a), an oil absorption number of 92 to 105 ml/100 g (ASTM D 2414-19) and an average primary particle size of 25 nm or less (ASTM D 3849-14aa); and (c) 0.05 to 2.0 wt % of at least one antioxidant, wherein the antioxidant is polymerized 2,2,4-trimethyl-1,2-dihydroquinoline;

all weight percentages being based on the total weight of the semiconductive polymer composition, unless mentioned otherwise.

* * * * *